(12) United States Patent
Matsumoto

(10) Patent No.: US 10,664,056 B2
(45) Date of Patent: May 26, 2020

(54) CONTROL DEVICE, INPUT SYSTEM AND CONTROL METHOD

(71) Applicant: DENSO TEN Limited, Kobe-shi, Hyogo (JP)

(72) Inventor: Shinsuke Matsumoto, Kobe (JP)

(73) Assignee: DENSO TEN LIMITED, Kobe-shi (JP)

(*) Notice: Subject to any disclaimer, the term of this patent is extended or adjusted under 35 U.S.C. 154(b) by 0 days.

(21) Appl. No.: 15/874,509

(22) Filed: Jan. 18, 2018

(65) Prior Publication Data
US 2018/0224940 A1    Aug. 9, 2018

(30) Foreign Application Priority Data
Feb. 3, 2017  (JP) .................................. 2017-018584

(51) Int. Cl.
*G06F 3/01* (2006.01)
*G06F 3/045* (2006.01)
*G06F 3/0488* (2013.01)

(52) U.S. Cl.
CPC .............. *G06F 3/016* (2013.01); *G06F 3/045* (2013.01); *G06F 3/04883* (2013.01)

(58) Field of Classification Search
CPC ....... G06F 3/016; G06F 3/045; G06F 3/04883
See application file for complete search history.

(56) References Cited

U.S. PATENT DOCUMENTS

| 7,336,260 | B2* | 2/2008 | Martin | G06F 1/1662 |
| | | | | 345/169 |
| 7,808,488 | B2* | 10/2010 | Martin | G06F 1/1662 |
| | | | | 345/169 |
| 2006/0290662 | A1* | 12/2006 | Houston | A63F 13/06 |
| | | | | 345/156 |
| 2007/0229455 | A1* | 10/2007 | Martin | G06F 1/1662 |
| | | | | 345/156 |
| 2008/0122315 | A1* | 5/2008 | Maruyama | G06F 3/016 |
| | | | | 310/314 |
| 2008/0297475 | A1* | 12/2008 | Woolf | G06F 3/0233 |
| | | | | 345/163 |
| 2010/0141606 | A1* | 6/2010 | Bae | G06F 3/016 |
| | | | | 345/174 |
| 2010/0207895 | A1* | 8/2010 | Joung | G06F 3/016 |
| | | | | 345/173 |
| 2011/0248916 | A1* | 10/2011 | Griffin | G06F 3/016 |
| | | | | 345/157 |

(Continued)

FOREIGN PATENT DOCUMENTS

| JP | 2005-149197 A | 6/2005 |
| JP | 2010-146510 A | 7/2010 |

(Continued)

*Primary Examiner* — Dmitriy Bolotin
(74) *Attorney, Agent, or Firm* — Oliff PLC

(57) ABSTRACT

There is provided a control device. An operation detection unit configured to detect an operation of a user on an operation surface of a panel. A driving unit configured to drive a vibration element attached to the panel to generate a vibration for the panel. When the operation is detected by the operation detection unit, the driving unit drives the vibration element to generate a first vibration for the panel and then to generate a second vibration which has an amplitude greater than an amplitude of the first vibration for the panel.

19 Claims, 8 Drawing Sheets

(56) References Cited

U.S. PATENT DOCUMENTS

| | | | |
|---|---|---|---|
| 2013/0271418 A1* | 10/2013 | Ishii | G06F 3/016 345/173 |
| 2015/0022138 A1* | 1/2015 | Hsu | H02P 23/04 318/689 |
| 2015/0338919 A1* | 11/2015 | Weber | G06F 3/016 345/156 |
| 2016/0220865 A1* | 8/2016 | Seo | G16H 40/63 |
| 2016/0276972 A1* | 9/2016 | Millett | G01H 13/00 |
| 2016/0357257 A1* | 12/2016 | Lim | G06F 3/041 |
| 2017/0168574 A1* | 6/2017 | Zhang | G06F 3/016 |
| 2017/0220114 A1* | 8/2017 | Iino | B60H 1/00985 |
| 2017/0228022 A1* | 8/2017 | Shimanouchi | G06F 3/041 |
| 2018/0113512 A1* | 4/2018 | Kang | G06F 3/0488 |
| 2018/0162273 A1* | 6/2018 | Ben Abdelaziz | B60K 37/06 |
| 2018/0213136 A1* | 7/2018 | Wang | G06F 3/0414 |

FOREIGN PATENT DOCUMENTS

| | | |
|---|---|---|
| JP | 2012-221387 A | 11/2012 |
| JP | 2013-109429 A | 6/2013 |
| JP | 2014-102654 A | 6/2014 |
| JP | 2014-142930 A | 8/2014 |
| JP | 2017-139023 A | 8/2017 |
| JP | 2017-139024 A | 8/2017 |

\* cited by examiner

CONTROL DEVICE, INPUT SYSTEM AND CONTROL METHOD

CROSS-REFERENCE TO RELATED APPLICATION

This application is based on and claims priority under 35 USC 119 from Japanese Patent Application No. 2017-18584 filed on Feb. 3, 2017.

TECHNICAL FIELD

The disclosed illustrative embodiment relates to a control device, an input system, and a control method.

RELATED ART

In the related art, an input system configured to enable a user to recognize reception of a user's operation on an operation surface of a panel by providing a tactile sensation to a user has been known. In the input system, when the operation surface of the panel is operated, a vibration element is vibrated with a voltage of a waveform obtained by applying an envelope to a sinusoidal wave, so that a click is generated (for example, refer to Patent Document 1).

Patent Document 1: JP-A-2013-109429

According to the input system of the related art, the vibration element is vibrated with the voltage of the sinusoidal wave of which amplitude decreases. Therefore, the vibration of the panel after the operation surface of the panel is operated provides the user with a sense of touch in which the first vibration is greatest and then the vibration decreases.

However, the input system of the related art does not provide the user with an operational feeling similar to an operational feeling on a mechanical switch. Therefore, there is room for improvements on the operational feeling to be provided to the user.

SUMMARY

It is therefore an object of the present invention is to provide a control device, an input system and a control method capable of improving an operational feeling that is to be provided to a user.

According to an aspect of the embodiment of the present invention, a control device includes an operation detection unit configured to detect an operation of a user on an operation surface of a panel, and a driving unit configured to drive a vibration element attached to the panel to generate a vibration for the panel. When the operation is detected by the operation detection unit, the driving unit drives the vibration element to generate a first vibration for the panel and then to generate a second vibration which has an amplitude greater than an amplitude of the first vibration for the panel.

According to an aspect of the illustrative embodiment, it is possible to provide the control device, the input system and the control method capable of improving an operational feeling that is to be provided to a user.

BRIEF DESCRIPTION OF THE DRAWINGS

Exemplary embodiment of the present invention will be described in detail based on the following figures, wherein.

DETAILED DESCRIPTION

Hereinafter, an illustrative embodiment of the control device, the input system and the control method of the disclosure will be described in detail with reference to the accompanying drawings. It should be noted that the present invention is not limited to the illustrative embodiment.

<1. Control Processing of Input System>

Figure 1:
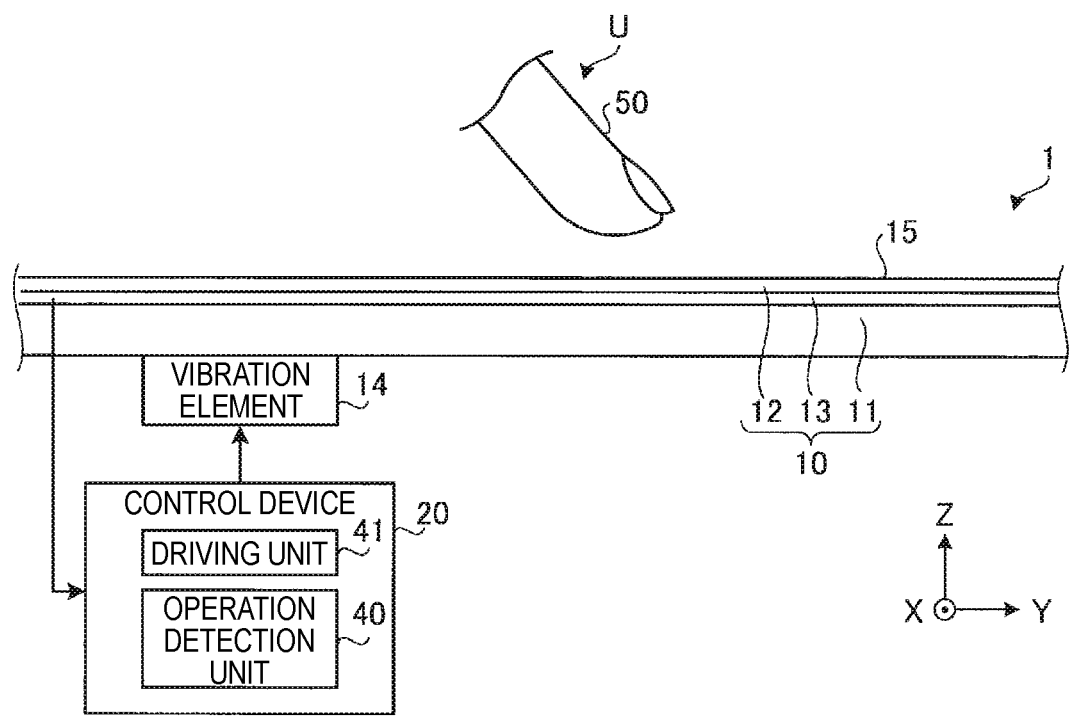
FIG. 1 depicts a schematic configuration example of an input system in accordance with an illustrative embodiment.

FIG. 1 depicts a configuration example of an input system 1 in accordance with an illustrative embodiment. As shown in FIG. 1, the input system 1 of the illustrative embodiment includes a panel 10, a vibration element 14, and a control device 20.

The panel 10 includes a support plate 11, a protection layer 12, and a pressure-sensitive sensor 13, and the pressure-sensitive sensor 13 and the protection layer 12 are sequentially stacked on the support plate 11. The protection layer 12 is formed by a resin member such as a resin film, for example, and a surface of the protection layer 12 is an operation surface 15 of the panel 10.

The pressure-sensitive sensor 13 is a sensor capable of detecting a contact position and a contact pressure of a user U on the operation surface 15 of the panel 10, and is a resistance pressure-sensitive touch sensor, for example. The vibration element 14 is attached to the panel 10, and is configured to vibrate by a driving voltage Vo that is to be output from the control device 20.

The control device 20 is configured to drive the vibration element 14 and to vibrate the panel 10, in correspondence to an operation of the user U (which may also be referred to as 'user operation', in the below) on the operation surface 15 of the panel 10. The control device 20 includes an operation detection unit 40, and a driving unit 41.

The operation detection unit 40 is configured to detect the user operation, based on the user contact position detected by the pressure-sensitive sensor 13. The driving unit 41 is configured to drive the vibration element 14 and to vibrate the panel 10, based on a detection result of the user operation detected by the operation detection unit 40.

When the user operation is detected by the operation detection unit 40, the driving unit 41 drives the vibration element 14 to vibrate the panel 10 so as to provide the user U with an operational feeling similar to an operational feeling on a mechanical switch. Meanwhile, in the below, the user operation is performed by a finger 50 of the user U but may also be performed by a stylus pen or the like.

Figure 2:
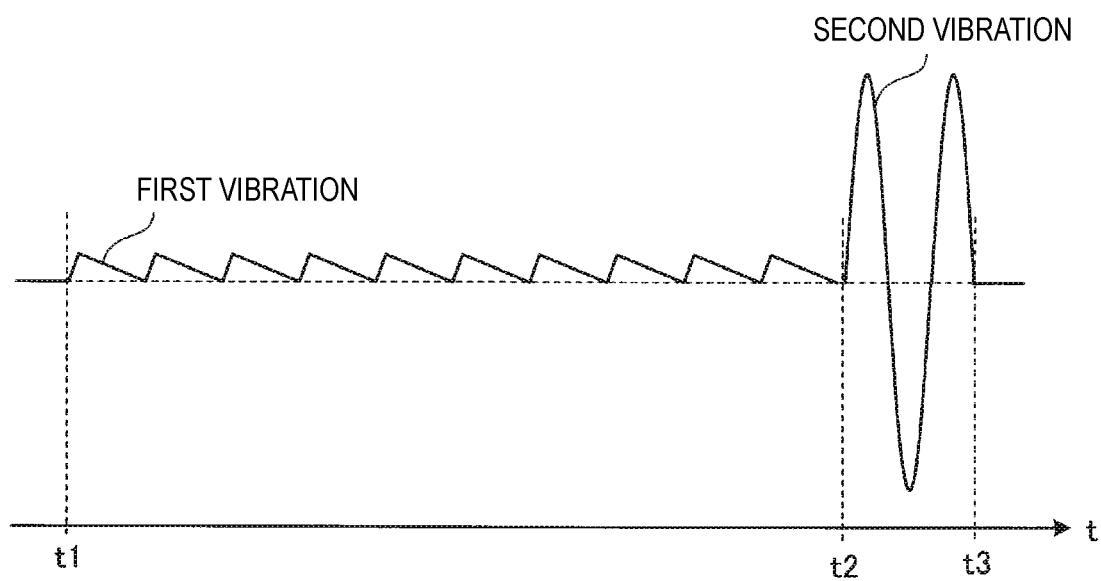
FIG. 2 depicts an example of a vibration of a panel, which is provided by a driving control unit in accordance with the illustrative embodiment.

FIG. 2 depicts an example of the vibration of the panel 10, which is provided by the control device 20. As shown in FIG. 2, when the user operation is detected by the operation detection unit 40, the driving unit 41 generates a first vibration for the panel 10 for a predetermined time period or longer (from time t1 to time t2), and then generates a second vibration greater than the first vibration for the panel 10 for a time period (from time t2 to time t3) shorter than the first vibration.

The first vibration is generated for the panel 10 for the predetermined time period or longer, so that the first vibration is transmitted to the finger 50 of the user U and the user U can feel a sense of depth of pressing on a switch. Further, the second vibration greater than the first vibration is generated for the panel 10 for the time period shorter than the first vibration, subsequently to the first vibration, so that the second vibration is transmitted to the finger 50 of the user U and the user U can feel a sense of click on the switch.

In this way, when the user operation is detected, the control device 20 of the illustrative embodiment generates the first vibration for the panel 10 and then generates the second vibration greater than the first vibration for the panel 10. For this reason, the user can feel the sense of depth and the sense of click, so that it is possible to provide the user U with the operational feeling similar to the operational feeling on the mechanical switch.

<2. Configuration of Electronic Device System>

Figure 3:
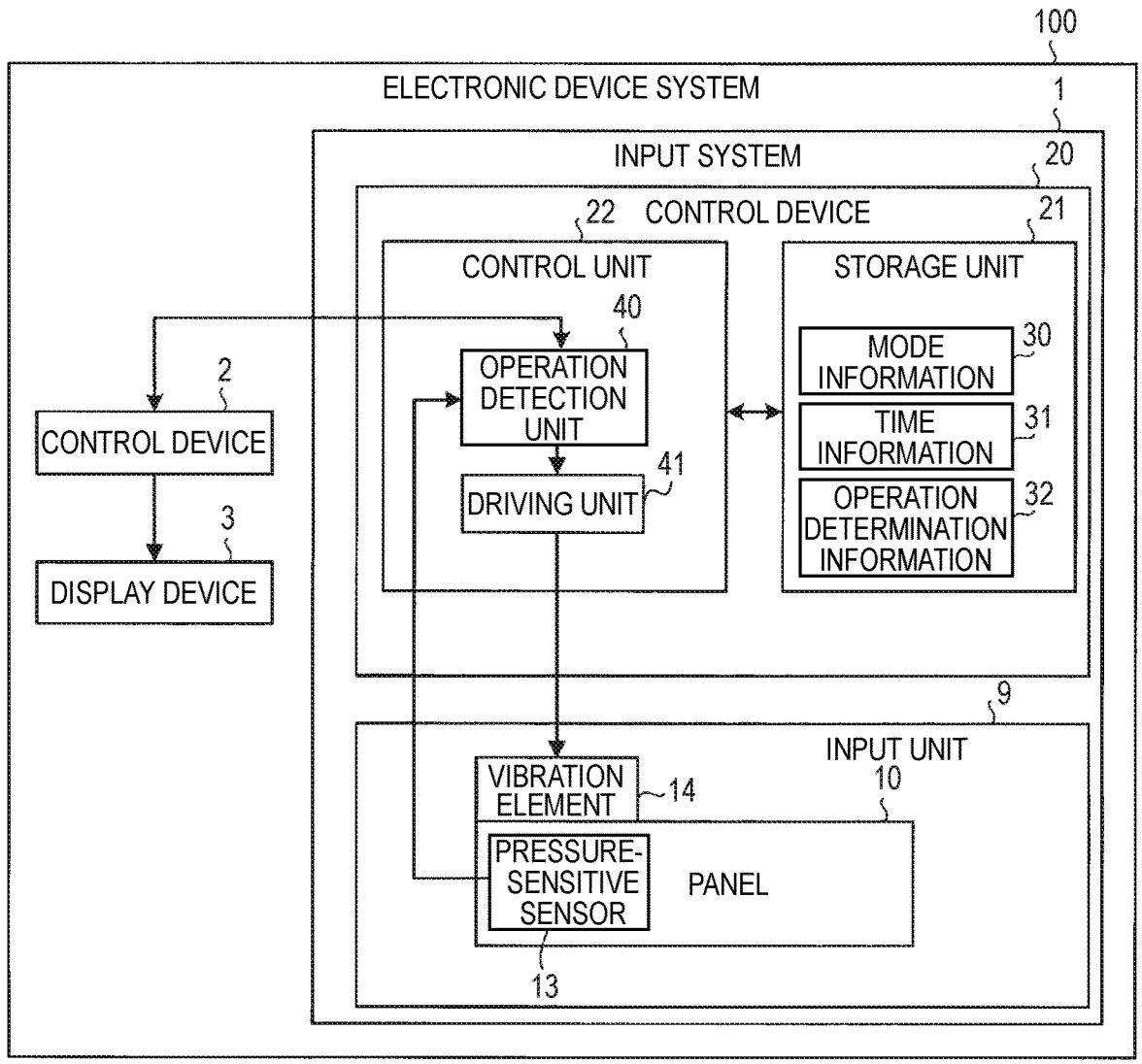
FIG. 3 depicts a configuration of an electronic device system having an input device in accordance with the illustrative embodiment.

FIG. 3 depicts a configuration of an electronic device system 100 having an input system in accordance with the illustrative embodiment. The electronic device system 100 shown in FIG. 3 is an in-vehicle system that is to be mounted on a vehicle. However, the present invention is not limited thereto. For example, the electronic device system may be a computer system including a PC (Personal Computer) and the like. The electronic device system 100 may include various components such as a central processing unit (CPU), a read only memory (ROM), a random access memory (RAM).

As shown in FIG. 3, the electronic device system 100 includes an input system 1, a control device 2, and a display device 3. The input system 1 is configured to receive an operation of the user U and to notify information indicative of the operation of the user U to the control device 2. The control device 2 is configured to control a screen that is to be displayed on the display device 3, in correspondence to the operation of the user U.

The input system 1 includes an input unit 9, and a control device 20. The input unit 9 includes a panel 10 and vibration elements 14. In the meantime, the pressure-sensitive sensor 13 of the panel 10 is a resistance pressure-sensitive touch sensor, for example, but may also be a pressure-sensitive sensor other than the resistance pressure-sensitive type.

The vibration elements 14 are attached to a front surface or a back surface of the panel 10. The vibration element 14 is a linear resonance actuator, for example, but may also be a piezo element or the like. Although not shown, the input unit 9 may include an amplification unit configured to amplify a driving voltage Vo, which is to be output from the control device 20, and to output the same to the vibration elements 14.

Figure 4:
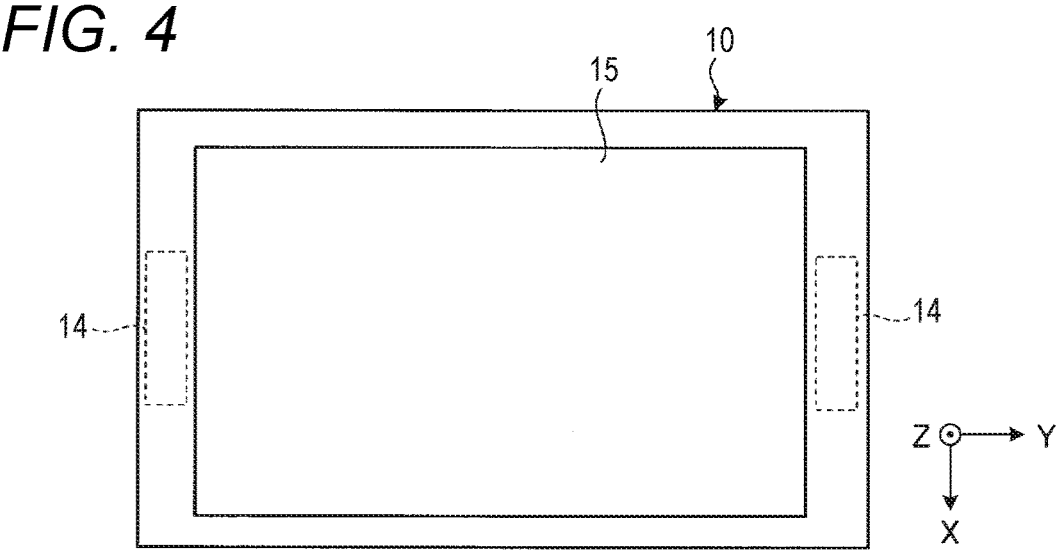
FIG. 4 depicts an arrangement example of vibration elements in accordance with the illustrative embodiment.

FIG. 4 depicts an arrangement example of the vibration elements 14 in accordance with the illustrative embodiment. In the example of FIG. 4, the input unit 9 includes the two vibration elements 14. The two vibration elements 14 are respectively arranged around the operation surface 15. In the meantime, the number of the vibration elements 14 is not limited to two and may be one or three or more. Also, the arrangement of the vibration elements 14 is not limited to the example of FIG. 4. For example, the vibration elements 14 may be arranged at positions corresponding to the operation surface 15 of the panel 10 (for example, a central part of the operation surface 15).

The control device 20 includes a storage unit 21, and a control unit 22. The storage unit 21 stores therein mode information 30, time information 31, and operation determination information 32. The mode information 30 is information indicative of a type of a vibration mode set via an input unit (not shown), for example, and one of a fixed mode and a variable mode is set as the type of the vibration mode.

The fixed mode is a mode of vibrating the panel 10 with a fixed vibration pattern, in response to a pressing operation of the user U on the operation surface 15 of the panel 10 (which may also be simply referred to as 'pressing operation', in the below), and the variable mode is a mode of vibrating the panel 10 with a vibration pattern corresponding to a state of the pressing operation.

The time information 31 is information defining a time period for which each vibration is to be generated, and includes information indicative of first to fourth time periods T1 to T4, which will be described later. The operation determination information 32 is information for determining the user operation, and includes information indicative of first to third thresholds Pth1 to Pth3 relating to a contact pressure of the user U on the operation surface 15, information indicative of a threshold Dth of a distance of a slide operation of the user U on the operation surface 15 of the panel 10 (which may also be referred to as 'slide operation', in the below), and the like. In the meantime, the slide operation is an operation of moving on the operation surface 15 of the panel 10.

The control unit 22 includes an operation detection unit 40, and a driving unit 41. The operation detection unit 40 is configured to acquire detection information indicative of a contact position and a contact pressure of the user on the operation surface 15, which are to be detected by the pressure-sensitive sensor 13. Also, the operation detection unit 40 is configured to acquire the operation determination information 32 stored in the storage unit 21.

The operation detection unit 40 is configured to detect the operation of the user U on the operation surface 15 of the panel 10, based on the detection information acquired from the pressure-sensitive sensor 13 and the operation determination information 32 acquired from the storage unit 21. The operation detection unit 40 can detect a variety of operations such as the pressing operation and the slide operation of the user U.

For example, when the contact position of the user U on the operation surface 15 is continuously located at the same position and the contact pressure is equal to or greater than the first threshold Pth1, the operation detection unit 40 may determine that there is the pressing operation of the user U on the operation surface 15. Also, when the contact pressure of the user U on the operation surface 15 is equal to or greater than the first threshold Pth1 and the contact position of the user U on the operation surface 15 is moved by the threshold Dth or longer, the operation detection unit 40 may determine that there is the slide operation.

When the pressing operation is detected by the operation detection unit 40, the driving unit 41 drives the vibration elements 14 to generate the first vibration W1 for the panel 10 and then to generate the second vibration W2 greater than the first vibration W1 for the panel 10.

Figure 5:
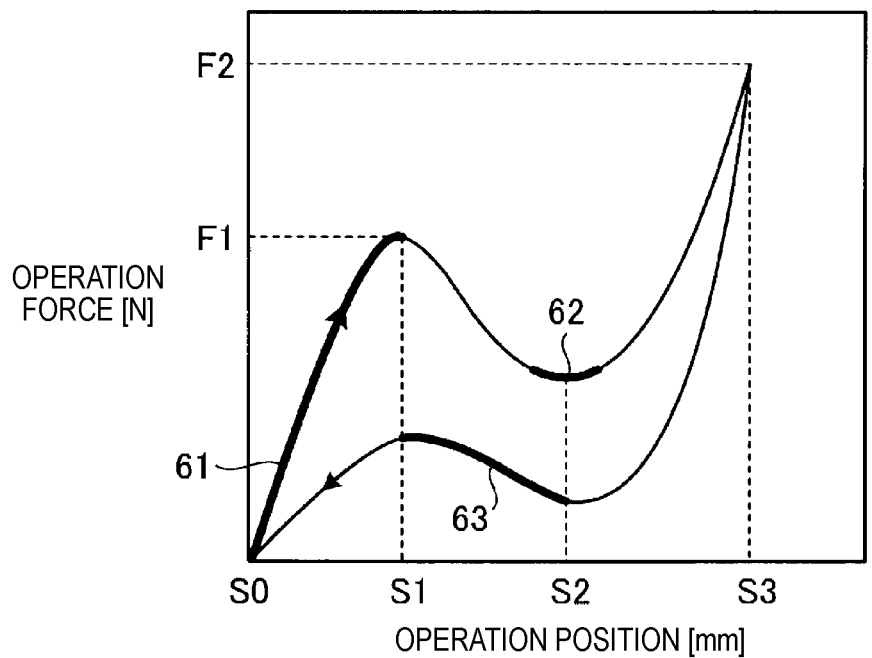
FIG. 5 depicts a characteristic of an operational feeling on a mechanical switch.

Here, a relation between an operation force and an operation position on a mechanical switch is described. FIG. 5 depicts a characteristic of an operational feeling on a mechanical switch. In FIG. 5, the operation force is a pressing force on an operation surface of the mechanical switch, and the operation position is a pressing position in a stroke direction of the mechanical switch.

As shown in FIG. 5, when the pressing operation of the user U on the mechanical switch starts, the user U should increase the operation force from an operation position S0, which indicates the pressing start on the mechanical switch, to an operation position S1. When the operation force reaches F1 at the operation position S1, the necessary operation force decreases to an operation position S2 and then increases. Thereafter, the operation force reaches an operation position S3, which is an end position.

Also, when the user U starts to detach the finger 50 from the mechanical switch at the operation position S3, the necessary operation force rapidly decreases from F2. However, the necessary operation force increases from the operation position S2 to the operation position S1. The reason is that a rubber switch provided to the mechanical switch returns after it is pressed. At this time, the user U instantaneously feels a pressure immediately before detaching the finger 50 from the mechanical switch.

Therefore, the driving unit 41 is configured to provide the user U with an operational feeling similar to the operational feeling on the mechanical switch by providing the panel 10 with vibrations corresponding to regions 61, 62, 63 shown in FIG. 5. The region 61 is a range of the operation position of the pressing start from the operation position S0 to the operation position S1. The region 62 is a predetermined range before and after the operation position S2 at which the minimum value of the operation force is to be obtained. The region 63 is a range from the operation position S2 to the operation position S1 immediately before the finger 50 of the user U is detached from the mechanical switch.

Figure 6:
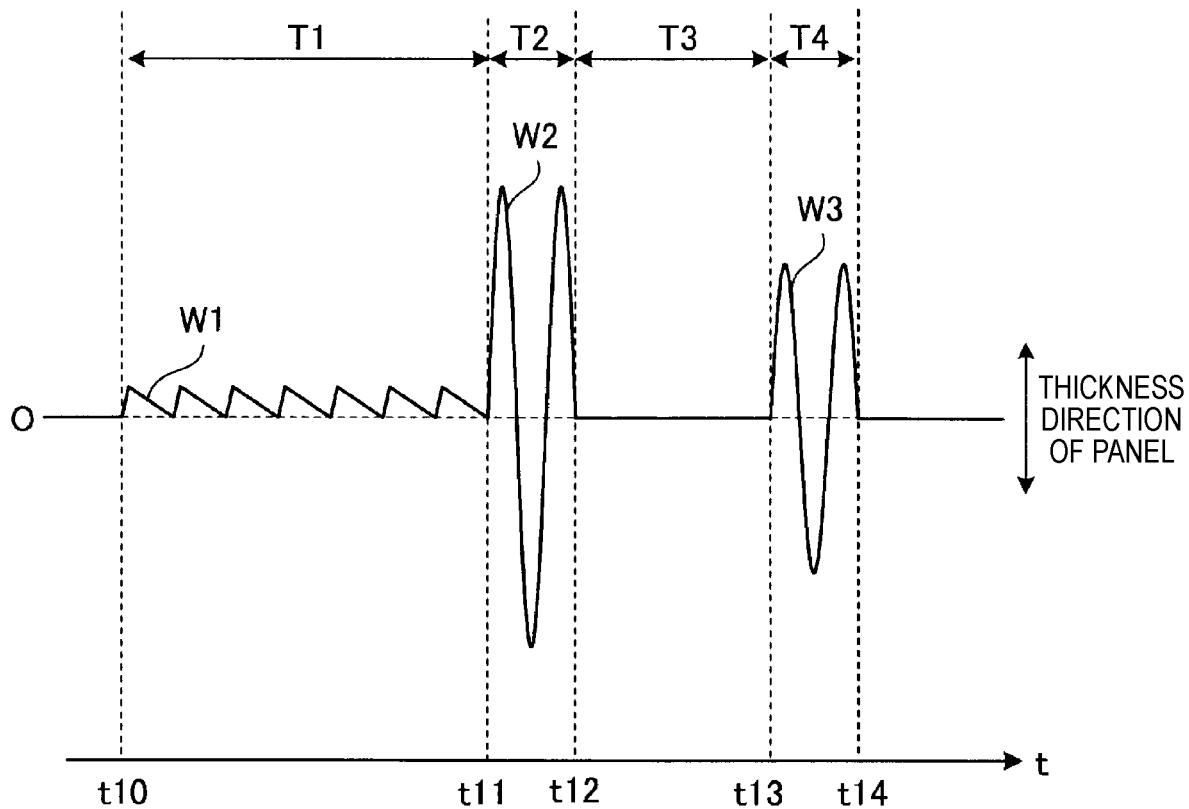
FIG. 6 depicts an example of the vibration of the panel, which is provided by the driving control unit in accordance with the illustrative embodiment.

FIG. 6 depicts an example of the vibration of the panel 10, which is to be generated by the driving unit 41. As shown in FIG. 6, when the user operation is detected by the operation detection unit 40, the driving unit 41 generates the first vibration W1 for the panel 10, generates the second vibration W2 for the panel 10 and then generates a third vibration W3 for the panel 10. The first to third vibrations W1 to W3 are vibrations in a thickness direction (a Z-axis direction shown in FIG. 1) of the panel 10.

By the first vibration W1, it is possible to provide the user U with a sense of depth upon the pressing on the switch. By the second vibration W2, it is possible to provide the user U with a sense of click of the switch operation. Also, by the third vibration W3, it is possible to provide the user U with a sense immediately before detaching the finger 50 from the switch. That is, the user U is enabled to feel the action that the rubber switch incorporated into the mechanical switch returns after it is pressed. For this reason, it is possible to provide the user U with a more realistic tactile sensation similar to the tactile sensation of the mechanical switch.

The driving unit 41 generates the first to third vibrations W1 to W3 for the panel 10, based on the type of the vibration mode set in the storage unit 21. The first to third vibrations W1 to W3 are frequencies of 100 to 200 Hz, for example. The vibration mode includes the fixed mode and the variable mode, as described above. In the below, the fixed mode and the variable mode are sequentially described.

First, the fixed mode is described. The driving unit 41 can generate the first to third vibrations W1 to W3 in the fixed mode, based on the time information 31 and operation determination information 32 stored in the storage unit 21.

When a pressure of the user operation is equal to or greater than the first threshold Pth1, the driving unit 41 detects that there is the operation of the user U on the operation surface 15, based on the operation determination information 32 stored in the storage unit 21. Then, the driving unit 41 applies a sawtooth wave-shaped driving voltage Vo1 to the vibration elements 14 until the first time period T1 elapses from detection timing (time t10) of the user operation, based on the time information 31 stored in the storage unit 21.

Thereby, for the time period (first time period T1) from time t10 to time t11, the first vibration W1 is generated for the panel 10 for a predetermined time period, so that the user U is enabled to feel a sense of depth of the pressing on the switch.

The first vibration W1 is a sawtooth wave-shaped vibration having a frequency (for example, 120 Hz) of 100 to 200 Hz. The sawtooth wave-shaped vibration is continuously applied for the predetermined time period or longer, so that it is possible to appropriately provide the user U with the sense of depth upon the pressing on the switch. In the meantime, the first vibration W1 may be a triangular wave-shaped vibration. By the triangular wave-shaped vibration, it is possible to appropriately provide the user U with the sense of depth upon the pressing on the switch, like the sawtooth wave-shaped vibration.

The driving unit 41 can suppress an amplitude of the first vibration W1 to a level at which the user U operating the panel 10 cannot hear or little hears a sound, which is output from the panel 10 by the first vibration W1. In this way, it is possible to avoid applying the user U with a discomfort feeling, which is caused due to the sound generated by the first vibration W1.

Also, since the first vibration W1 is the sawtooth wave-shaped vibration or the triangular wave-shaped vibration, displacement of the panel 10 is changed to a linear shape. For this reason, as compared to a vibration of sinusoidal wave, it is possible to appropriately provide the sense of depth upon the pressing on the switch. In the meantime, the first vibration W1 may be a sinusoidal wave-shaped vibration. Also, the first vibration W1 may be a vibration lower than 100 Hz or a vibration higher than 200 Hz inasmuch as it is possible to provide the sense of depth.

Also, as shown in FIG. 6, the first vibration W1 is a vibration biased to one side or the other side in the thickness direction of the panel 10 with respect to a center O of the panel 10 in the thickness direction. By biasing the first vibration W1 with respect to the center O of the panel 10 in the thickness direction, it is possible to more appropriately provide the user U with the sense of depth upon the pressing on the switch, as compared to the first vibration W1 that is not biased with respect to the center O.

Then, the driving unit 41 applies a sinusoidal wave-shaped driving voltage Vo2 to the vibration elements 14 for a second time period T2 from time t11 to time t12, based on the time information 31 stored in the storage unit 21. The driving voltage Vo2 is a voltage higher than the driving voltage Vo1. Also, the second time period T2 is shorter than the first time period T1, and the second vibration W2 is a vibration within two periods of the sinusoidal wave, for example.

In this way, the driving voltage Vo2 higher than the driving voltage Vo1 is applied to the vibration elements 14 for the second time period T2, so that it is possible to provide the user U with the sense of click by instantaneously providing the user U with the relatively large vibration. Also, since the second time period T2 is the vibration within the two periods of the sinusoidal wave, even when the sound is output from the panel 10 by the second vibration W2, the output time period thereof is short, so that it is possible to suppress the sound from the panel 10 to a range in which the user U cannot recognize the same. Thereby, it is possible to avoid applying the user U with a discomfort feeling.

In the meantime, the second vibration W2 is a frequency (for example, 160 Hz) within a range of 100 to 200 Hz but may be a vibration lower than 100 Hz or a vibration higher than 200 Hz inasmuch as it is possible to provide the sense of click.

Subsequently, the driving unit 41 sets the driving voltage Vo applied to the vibration elements 14 to zero for a third time period T3 from time t12 to time t13, based on the time information 31 stored in the storage unit 21, thereby stopping the vibration of the panel 10.

At time t13, the driving unit 41 applies a sinusoidal wave-shaped driving voltage Vo3 to the vibration elements 14 for a fourth time period T4 from time t13 to time t14, based on the time information 31 stored in the storage unit 21. The driving voltage Vo3 is a voltage higher than the driving voltage Vo1. Also, the fourth time period T4 is shorter than the first time period T1, and the third vibration W3 is a vibration within the two periods of the sinusoidal wave, for example.

In this way, the driving voltage Vo3 having an amplitude greater than the amplitude of the driving voltage Vo1 is applied to the vibration elements 14 for the fourth time period T4, so that it is possible to provide the user U with a sense, which the user U can feel when detaching the finger 50 from the switch, by instantaneously providing the user U with the relatively large vibration.

Also, the amplitude of the driving voltage Vo3 is smaller than the amplitude of the driving voltage Vo2, so that it is possible to make the third vibration W3 smaller than the second vibration W2. For this reason, the vibration smaller than the sense of click applied to the user U by the second vibration W2 is provided to the user U, so that it is possible to appropriately provide the user U with a sense, which the user U can feel when detaching the finger 50 from the switch.

In the meantime, the third vibration W3 is a frequency (for example, 120 Hz) within a range of 100 to 200 Hz but may be a vibration lower than 100 Hz or a vibration higher than 200 Hz inasmuch as it is possible to provide the user U with a sense, which the user U can feel when detaching the finger 50 from the switch.

Also, since the fourth time period T4 is the vibration within the two periods of the sinusoidal wave, even when the sound is output from the panel 10 by the third vibration W3, the output time period thereof is short, so that it is possible to suppress the sound from the panel 10 to a range in which the user U cannot recognize the same. Thereby, it is possible to avoid applying the user U with a discomfort feeling.

In this way, in the fixed mode, the driving unit 41 applies the driving voltages Vo corresponding to the first to fourth time periods T1 to T4 corresponding to the time information 31 to the vibration elements 14, based on the time information 31 stored in the storage unit 21, so that it is possible to provide the user U with the operational feeling similar to the operational feeling on the mechanical switch.

In the meantime, the operation detection unit 40 can store the detection information, which indicates the contact position and contact pressure acquired from the pressure-sensitive sensor 13, in the storage unit 21, as a detection hysteresis. The operation detection unit 40 can determine a pattern of the pressing operation of the user U, based on the detection hysteresis stored in the storage unit 21, and can determine the first time period T1 and the third time period T3 on the basis of the determined pattern. The operation detection unit 40 updates the time information 31 stored in the storage unit 21, based on information indicative of the determined first time period T1 and third time period T3.

For example, the operation detection unit 40 determines a time period T11 after a pressure of the user operation (which may also be referred to as 'operation pressure', in the below) becomes the first threshold Pth1 or greater until the operation pressure becomes greatest, and a time period T12 after the operation pressure becomes greatest until the pressure of the user operation becomes the second threshold Pth2 or smaller. Then, the operation detection unit 40 can determine the first time period T1 and the third time period T3, based on an average value T11av of the time period T11 and an average value T12av of the time period T12. For example, the operation detection unit 40 may determine a ⅓ time period of the average value T11av as the first time period T1, and determine a ½ time period of the average value T12av as the third time period T3.

In the below, the variable mode is described. In the variable mode, the driving unit 41 generates the first to third vibrations W1 to W3, based on the contact pressure F on the operation surface 15 detected by the pressure-sensitive sensor 13 and the operation determination information 32 stored in the storage unit 21.

Figure 7:
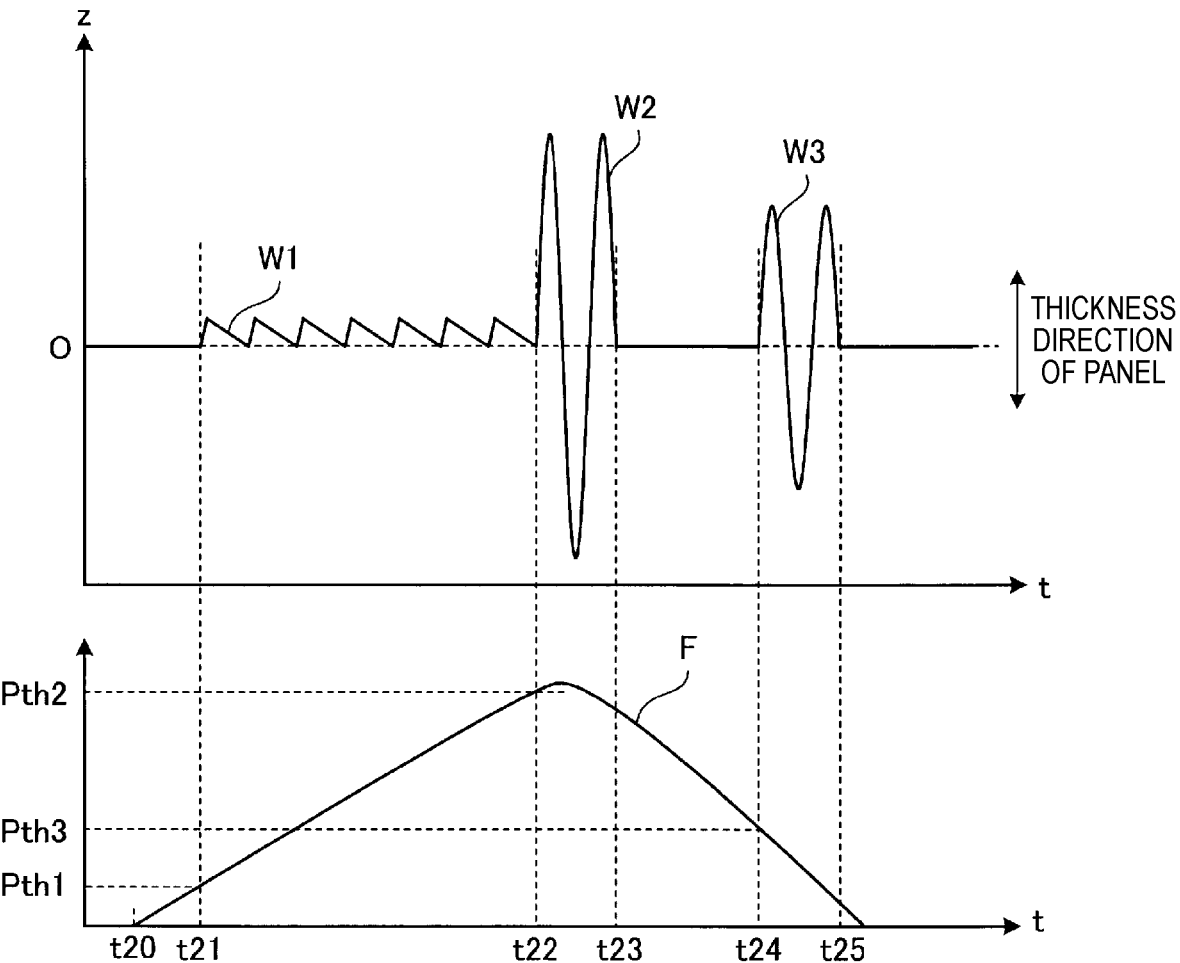
FIG. 7 depicts a relation between the vibration of the panel and a contact pressure in a variable mode.

FIG. 7 depicts a relation between the vibration of the panel 10 and the contact pressure F of the user U on the operation surface 15 in the variable mode. In the example of FIG. 7, at time t20, the user U starts the pressing operation and then the contact pressure F of the user U on the operation surface 15 increases. The driving unit 41 repetitively determines whether the contact pressure F becomes the first threshold Pth1 or greater. When it is determined that the contact pressure F becomes the first threshold Pth1 or greater (time t21), the driving unit 41 applies the driving voltage Vo1 to the vibration elements 14. Thereby, the first vibration W1 is generated for the panel 10.

Then, the driving unit 41 determines whether the contact pressure F becomes the second threshold Pth2 or greater or becomes smaller than the first threshold Pth1. When it is determined that the contact pressure F is not the second threshold Pth2 or greater or is not smaller than the first threshold Pth1, the driving unit 41 continues to apply the driving voltage Vo1 to the vibration elements 14. Thereby, the first vibration W1 is continuously generated for the panel 10, so that it is possible to more appropriately provide the user U with the sense of depth upon the pressing on the switch.

When the contact pressure F becomes the first threshold Pth1 or smaller, the driving unit 41 sets the voltage applied to the vibration elements 14 to zero, thereby stopping the vibration of the panel 10. On the other hand, when it is determined that the contact pressure F becomes the second threshold Pth2 or greater (time t22), the driving unit 41 applies the driving voltage Vo2 to the vibration elements 14 for the second time period T2 (from time t22 to time t23). Thereby, it is possible to provide the user U with the sense of click by instantaneously providing the user U with the relatively large vibration.

After the contact pressure F becomes the second threshold Pth2 or greater, the driving unit 41 determines whether the contact pressure F becomes the third threshold Pth3 or smaller. When it is determined that the contact pressure F becomes the third threshold Pth3 or smaller (time t24), the driving unit 41 applies the sinusoidal wave-shaped driving voltage Vo3 to the vibration elements 14 for the fourth time period T4 (from time t24 to time t25). Thereby, it is possible to provide the user U with a sense, which the user U can feel when detaching the finger 50 from the switch.

In this way, in the variable mode, the driving unit 41 generates the first to third vibrations W1 to W3, based on the contact pressure F of the user U on the operation surface 15 of the panel 10 and the operation determination information 32 stored in the storage unit 21. For this reason, even when the contact time period or the contact pressure F of the pressing operation is different for each user U, it is possible to provide the user U with the appropriate operational feeling.

Figure 8:
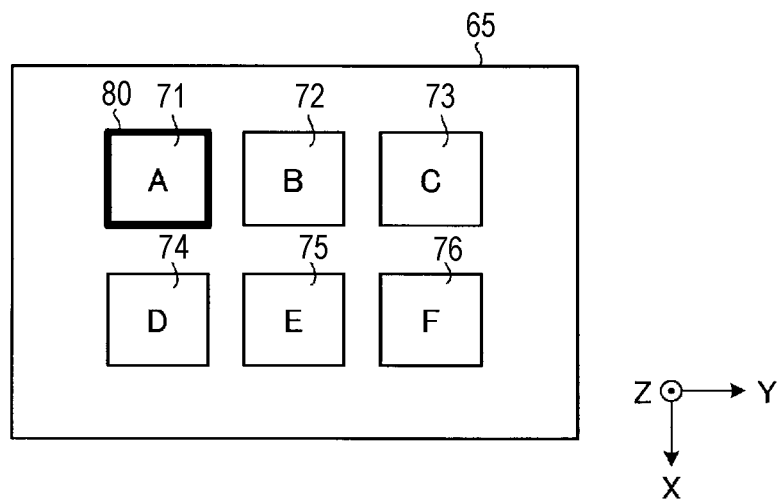
FIG. 8 depicts an example of a screen, which is displayed on a display device in accordance with the illustrative embodiment.
Figure 9:
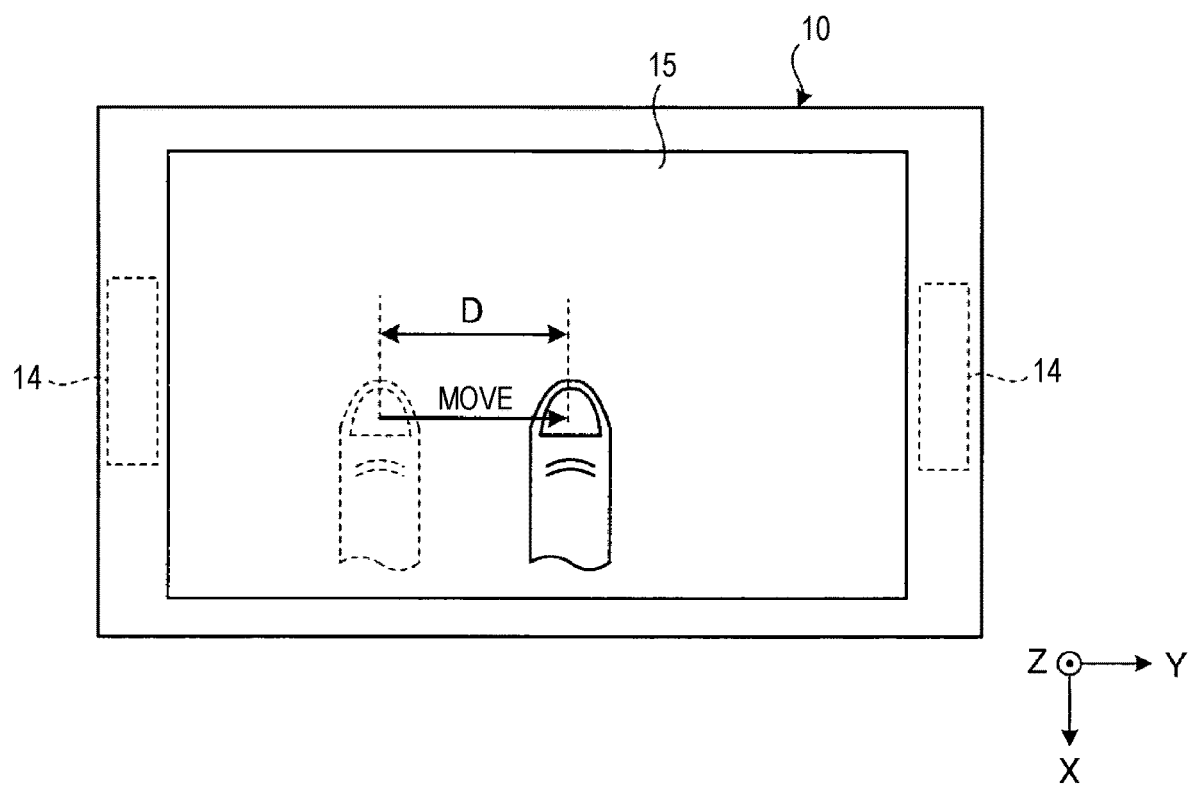
FIG. 9 depicts an example of a user operation on an operation surface of the panel.
Figure 10:
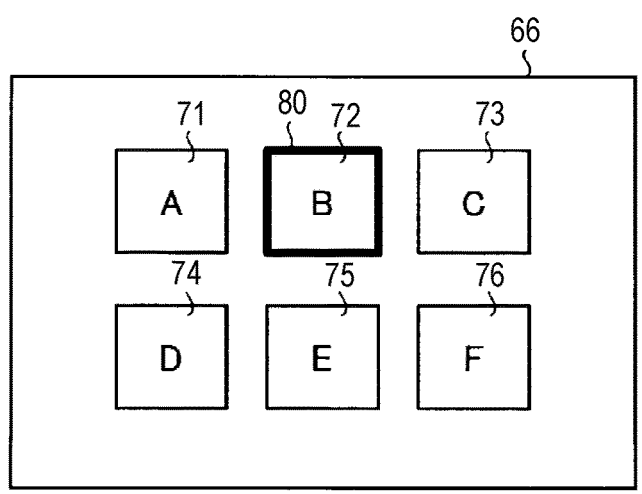
FIG. 10 depicts an example of the screen, which is displayed on the display device in accordance with the illustrative embodiment.

Here, a relation between a screen to be displayed on the display device 3 and an input operation of the user U is described. FIGS. 8 and 10 depict examples of the screen that is to be displayed on the display device 3, and FIG. 9 depicts an example of the operation of the user U on the operation surface 15 of the panel 10.

The screen shown in FIG. 8 is a menu screen 65 that is displayed on the display device 3, and six icons 71 to 76 (which may be collectively referred to as 'icon 70', in the below) are displayed. The user U may confirm selection of the icon 70 by temporarily selecting any one of the icons 71 to 76 by the slide operation on the operation surface 15 of the panel 10 and then performing the pressing operation on the operation surface 15.

At a state of FIG. 8, the icon 71 is emphasized by an emphasis frame 80, and the icon 71 is temporarily selected. When the user U wants to select the icon 72, the user moves the contact position on the operation surface 15 by a distance D equal to or greater than the threshold Dth in a direction (here, a rightward direction) corresponding to a direction from the icon 71 toward the icon 72, as shown in FIG. 9, for example, so that the operation detection unit 40 of the control device 20 detects the rightward slide operation of the user U. When the operation detection unit 40 of the control device 20 detects the rightward slide operation, the operation detection unit 40 outputs information indicative of the rightward slide operation to the control device 2.

When the control device 2 receives the information indicative of the rightward slide operation from the control device 20 of the input system 1, the control device 2 generates information of a menu screen 66 shown in FIG. 10, and displays the menu screen 66 on the display device 3. In the menu screen 66 of FIG. 10, the icon 72 is emphasized by the emphasis frame 80, and the icon 72 is temporarily selected.

In the menu screen 66 shown in FIG. 10, when the user U performs the pressing operation on the operation surface 15, the first to third vibrations W1 to W3 are sequentially generated for the panel 10, so that the user U can have the operational feeling similar to the operational feeling on the mechanical switch.

Here, the electronic device system 100 may set the first to third thresholds Pth1 to Pth3 for each of the icons 71 to 76, and the storage unit 21 of the control device 20 may store therein the first to third thresholds Pth1 to Pth3 for each of the icons 71 to 76.

In this case, when the icon 72 is temporarily selected, the control device 2 notifies information indicative of the icon 72 to the control device 20 of the input system 1. When the control device 20 receives the information indicative of the icon 72, the control device 20 can select the first to third thresholds Pth1 to Pth3 corresponding to the icon 72, and execute the variable mode on the basis of the selected first to third thresholds Pth1 to Pth3.

Also, the electronic device system 100 can change the first to third vibrations W1 to W3 for each of the icons 71 to 76, and the storage unit 21 of the control device 20 can store therein the information of the first to third vibrations W1 to W3 for each of the icons 71 to 76. The information of the first to third vibrations W1 to W3 is information of the waveforms, frequencies, and amplitudes of the driving voltages Vo1 to Vo3.

In this case, when the icon 72 is temporarily selected, the control device 2 notifies the information indicative of the icon 72 to the control device 20 of the input system 1. When the information indicative of the icon 72 is received, the control device 20 can select the information of the first to third vibration W1 to W3 corresponding to the icon 72, and execute the fixed mode or the variable mode, based on the selected information of the first to third vibrations W1 to W3.

Figure 11:
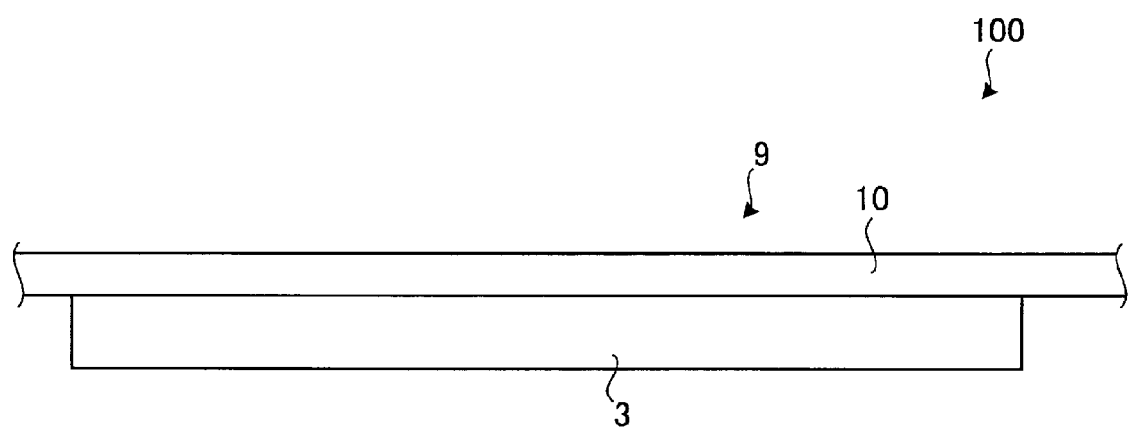
FIG. 11 depicts a relation between the input device and the display device of the electronic device system in accordance with the illustrative embodiment.

As shown in FIG. 11, the electronic device system 100 may include a touch panel display having integrated the input unit 9 and the display device 3. FIG. 11 depicts a relation between the input unit 9 and the display device 3 of the electronic device system 100. As shown in FIG. 11, the display device 3 is disposed on a back surface of the panel 10, and the user U can see the screen displayed on the display device 3 through the panel 10.

Figure 12:
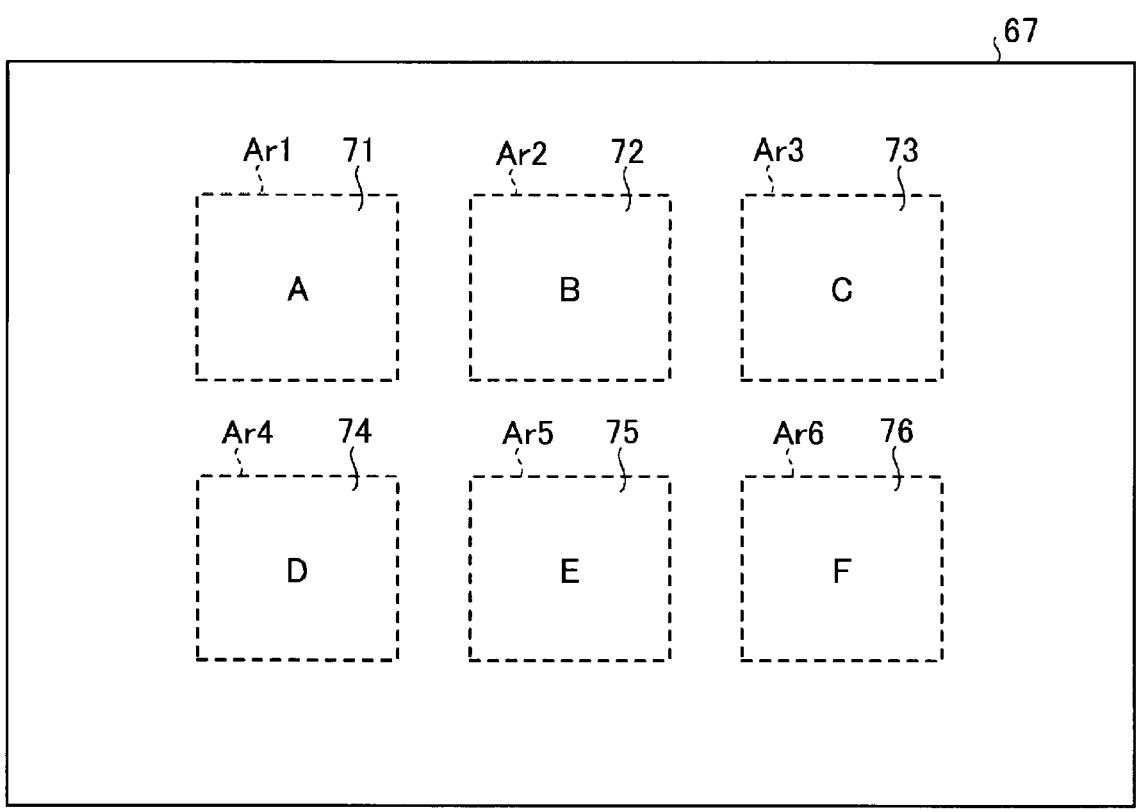
FIG. 12 depicts a relation between regions in which information of thresholds and information of first to third vibrations are set and a menu screen of the display device.

The control device 2 of the electronic device system 100 shown in FIG. 11 can set the information of the first to third thresholds Pth1 to Pth3 and the first to third vibration W1 to W3 corresponding to a position of a display screen of the display device 3 to the control device 20. FIG. 12 depicts a relation between regions Ar1 to Ar6, for which the information of the first to third thresholds Pth1 to Pth3 and the information of the first to third vibrations W1 to W3 are set, and a menu screen 67 of the display device 3. The regions Ar1 to Ar6 are regions corresponding to the icons 71 to 76 shown in FIGS. 8 and 10, respectively, and may also be collectively referred to as 'region Ar', in the below.

In the example of FIG. 12, the control device 2 outputs, to the control device 20 of the input system 1, setting information, which includes information indicative of positions of the regions Ar1 to Ar6 and information of the first to third thresholds Pth1 to Pth3 and information of the first to third vibrations W1 to W3 for each of the regions Ar1 to Ar6. When the setting information is received from the control device 2, the control unit 22 of the control device 20 stores the received setting information in the storage unit 21.

When the contact position of the user U on the operation surface 15 is within any one region of the regions Ar1 to Ar6, the control device 20 can acquire, from the storage unit 21, the information of the first to third thresholds Pth1 to Pth3 and the information of the first to third vibrations W1 to W3 corresponding to the region Ar in which the contact position of the user U is included, and apply the vibration corresponding to the region Ar, in response to the pressing operation of the user U on the region Ar, based on the acquired information.

In the meantime, the setting information may be one or more information of the information of the first to third thresholds Pth1 to Pth3 and the information of the first to third vibrations W1 to W3. Also, in the above example, the different setting information is provided on the same screen. However, the different setting information may be provided on the different screens. Alternatively, the same region Ar may be divided, and the different setting information may be provided to the divided regions.

In the meantime, for a region except for the regions Ar1 to Ar6, the first to third thresholds Pth1 to Pth3 may be set to values greater than the maximum value of the contact pressure of the user U, for example. Thereby, it is possible to suppress the first to third vibrations W1 to W3 from being generated in the region except for the regions Ar1 to Ar6, without changing the processing for an operation at any position of the operation surface 15.

<3. Processing that is to be Executed by Control Device 20 of Input System 1>

Figure 13:
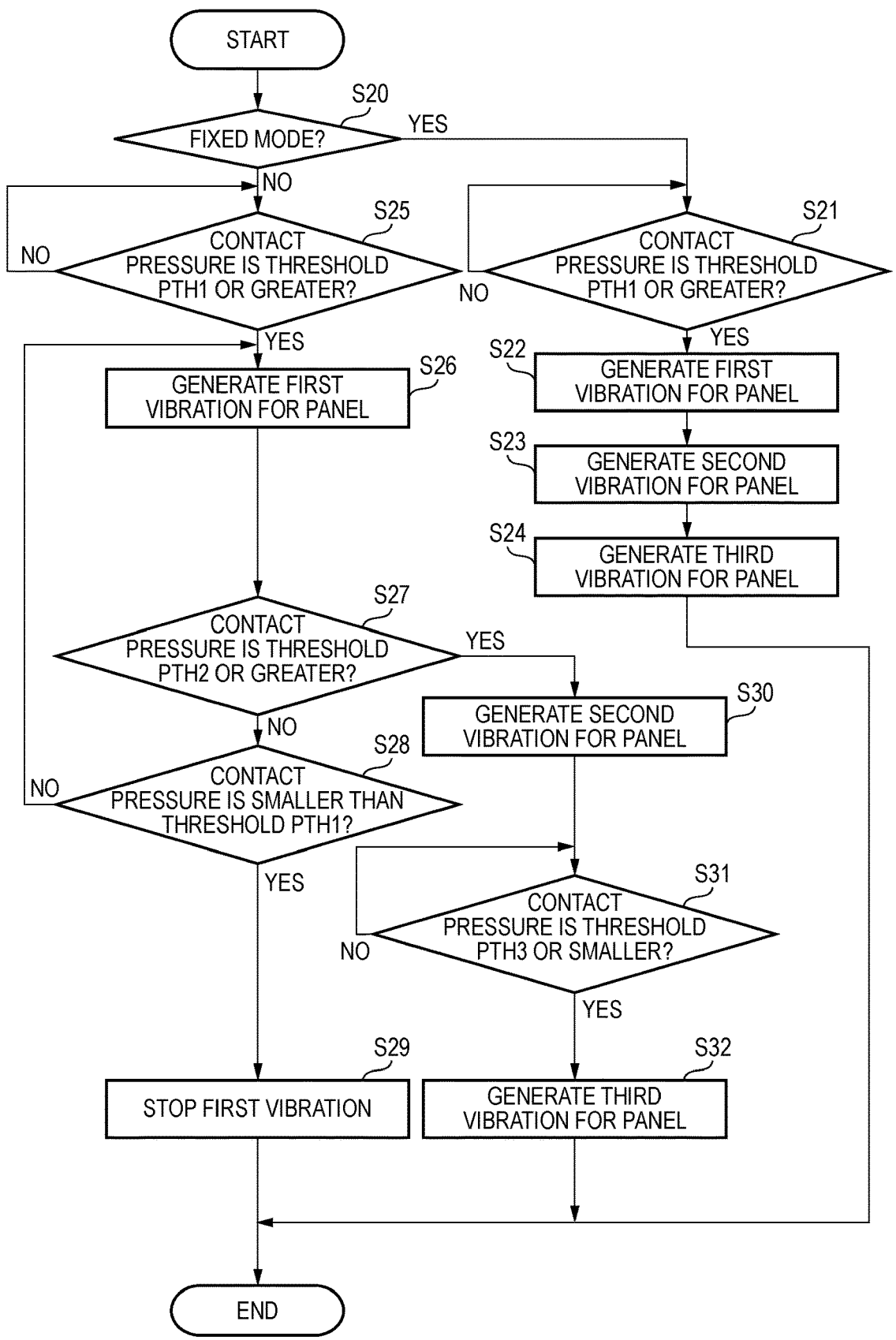
FIG. 13 is a flowchart depicting an example of a processing sequence that is to be executed by a control unit in accordance with the illustrative embodiment.

Subsequently, an example of processing that is to be executed by the control unit 22 of the control device 20 is described with reference to a flowchart. FIG. 13 depicts a flowchart showing an example of a processing sequence that is to be repetitively executed by the control unit 22.

As shown in FIG. 13, the control unit 22 determines whether the type of the vibration mode set in the storage unit 21 is the fixed mode or not (step S20). When it is determined that the type of the vibration mode is the fixed mode (step S20; Yes), the control unit 22 determines whether the contact pressure of the user U on the operation surface 15 resulting from the pressing of the user U on the operation surface 15 becomes the first threshold Pth1 or greater (step S21). When it is determined that the contact pressure is not the first threshold Pth1 or greater (step S21; No), the control unit 22 repeats the processing of step S21.

When it is determined that the contact pressure becomes the first threshold Pth1 or greater (step S21; Yes), the control unit 22 applies the driving voltage Vo1 to the vibration elements 14 to generate the first vibration W1 for the panel 10 only for the first time period T1 (step S22). Thereafter, the control unit 22 applies the driving voltage Vo2 to the vibration elements 14 to generate the second vibration W2 for the panel 10 only for the second time period T2 (step S23).

Subsequently, the control unit 22 applies the driving voltage Vo of zero to the vibration elements 14 only for the third time period T3, and then applies the driving voltage Vo3 to the vibration elements 14 to generate the third vibration W3 for the panel 10 only for the fourth time period T4 (step S24).

On the other hand, when it is determined in step S20 that the type of the vibration mode is the variable mode (step S20: No), the control unit 22 determines whether the contact pressure of the user U on the operation surface 15 resulting from the pressing of the user U on the operation surface 15 becomes the first threshold Pth1 or greater (step S25).

When it is determined that the contact pressure becomes the first threshold Pth1 or greater (step S25; Yes), the control unit 22 applies the driving voltage Vo1 to the vibration elements 14 to generate the first vibration W1 for the panel 10 (step S26). On the other hand, when it is determined that the contact pressure is not the first threshold Pth1 or greater (step S25; No), the control unit 22 repeats the processing of step S25.

After ending the processing of step S26, the control unit 22 determines whether the contact pressure of the user U on the operation surface 15 becomes the second threshold Pth2 or greater (step S27). When it is determined that the contact pressure is not the second threshold Pth2 or greater (step S27; No), the control unit 22 determines whether the contact pressure of the user U on the operation surface 15 becomes smaller than the first threshold Pth1 (step S28).

When it is determined in step S28 that the contact pressure becomes smaller than the first threshold Pth1 (step S28; Yes), the control unit 22 applies the driving voltage Vo of zero to the vibration elements 14, thereby stopping the first vibration W1 (step S29). On the other hand, when it is determined in step S28 that the contact pressure is not smaller than the first threshold Pth1 (step S28; No), the control unit 22 proceeds to step S26.

When it is determined in step S27 that the contact pressure becomes the second threshold Pth2 or greater (step S27; Yes), the control unit 22 applies the driving voltage Vo2 to the vibration elements 14 to generate the second vibration W2 for the panel 10 only for the second time period T2 (step S30). Then, the control unit 22 determines whether the contact pressure of the user U on the operation surface 15 becomes the third threshold Pth3 or smaller (step S31).

When it is determined in step S31 that the contact pressure is not the third threshold Pth3 or smaller (step S31; No), the control unit 22 repeats the processing of step S31. On the other hand, when it is determined that the contact pressure becomes the third threshold Pth3 or smaller (step S31; Yes), the control unit 22 applies the driving voltage Vo3 to the vibration elements 14 to generate the third vibration W3 for the panel 10 only for the fourth time period T4 (step S32). When the processing of step S24 is over, when the processing of step S29 is over or when the processing of step S32 is over, the control unit 22 repetitively executes the processing from step S20.

Figure 14:
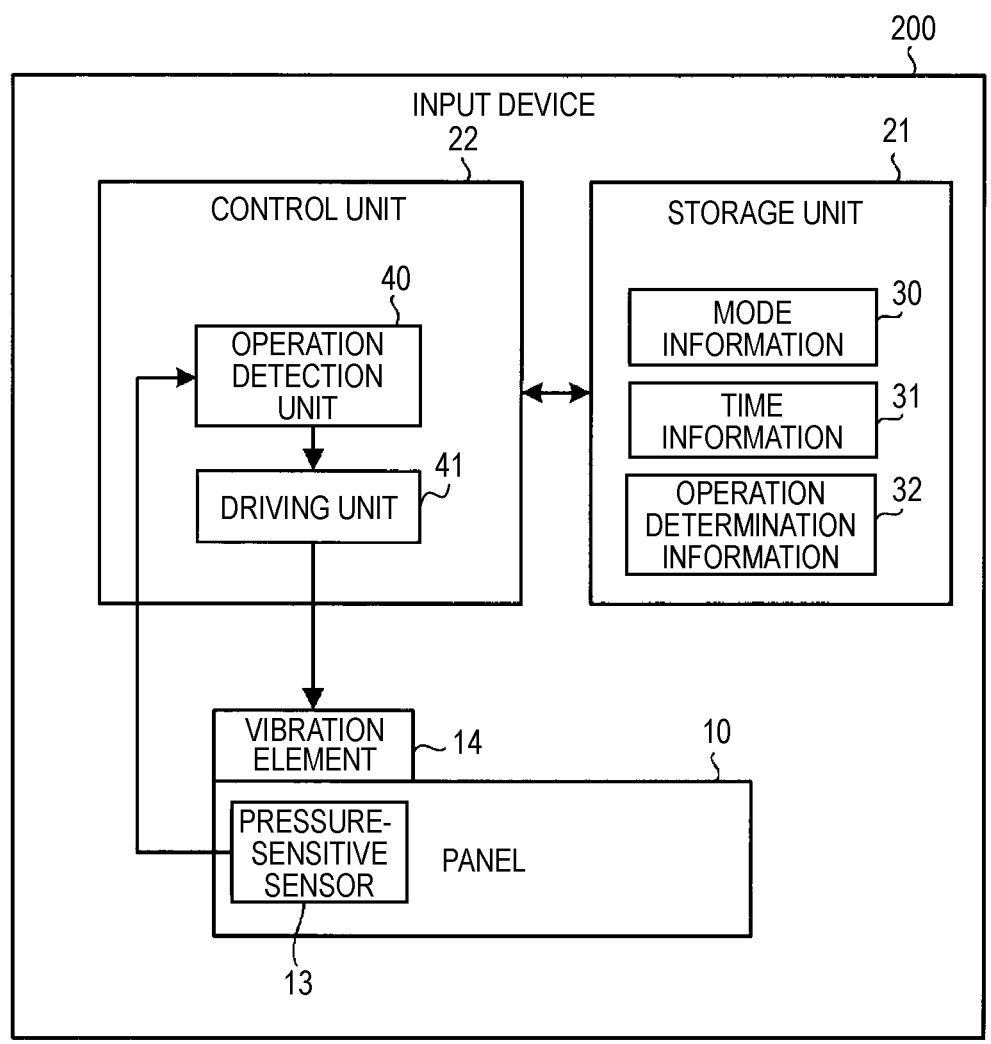
FIG. 14 depicts a configuration example of the input device in accordance with the illustrative embodiment.

In the above illustrative embodiment, the input unit 9 and the control device 20 have been dividedly described. However, the input system 1 may be an input device in which the input unit 9 and the control device 20 are integrally configured. FIG. 14 depicts a configuration example of an input device 200 of the illustrative embodiment.

The input device 200 shown in FIG. 14 includes the panel 10, the vibration elements 14, the storage unit 21, and the control unit 22, and the input unit 9 and the control device 20 shown in FIG. 3 are integrated thereto. In this way, the input device having the input unit 9 and the control device 20 integrated thereto may be configured. In the meantime, the control device 20 and the control device 2 may be integrated, and the input system 1, the control device 2, and the display device 3 may be integrated.

Also, in the above illustrative embodiment, the fixed mode and the variable mode have been described as the vibration mode. However, when only the fixed mode is used, an electrostatic capacitance type touch sensor may be used instead of the pressure-sensitive sensor 13. In this case, the control device 20 may start the vibration of the panel 10 when a contact operation of the user U on the touch sensor is detected.

Also, in the above illustrative embodiment, the first to third vibrations W1 to W3 are generated for the panel 10, in response to the pressing operation of the user U on the operation surface 15. However, the first to third vibrations W1 to W3 may be generated for the panel 10, in response to the slide operation of the user U on the operation surface 15.

In this case, the control device 20 uses first to third thresholds Dth1 to Dth3, instead of the first to third thresholds Pth1 to Pth3. When the distance D of the sliding movement of the operation position of the user U detected by the operation detection unit 40 exceeds the first threshold Dth1, the driving unit 41 of the control device 20 generates the first vibration W1, and when the distance D then exceeds the second threshold Dth2, the driving unit 41 generates the second vibration W2.

When the distance D exceeds the second threshold Dth2, the driving unit 41 generates the third vibration W3. In this way, the first to third vibrations W1 to W3 are generated in correspondence to the distances of the sliding movement of the operation position of the user U on the operation surface 15, so that it is possible to provide a sense as if the user operates a mechanical slide button. Also, when the slide operation is detected, the driving unit 41 may generate the first to third vibrations W1 to W3 for the panel 10 for the preset time period in the fixed mode.

In the above example, the contact pressure of the user U on the operation surface 15 is detected using the pressure-sensitive sensor 13. However, instead of the pressure-sensitive sensor 13, an electromechanical conversion element such as a piezo element may be attached to the panel 10. In this case, the operation detection unit 40 is configured to detect the contact pressure of the user U on the operation surface 15, based on a voltage to be output from the electromechanical conversion element under non-driven state.

As described above, the control device 20 of the illustrative embodiment includes the operation detection unit 40 configured to detect the user operation, which is the operation of the user U on the operation surface 15 of the panel 10, and the driving unit 41 configured to drive the vibration elements 14 attached to the panel 10 to generate the vibration for the panel 10. When the user operation is detected by the operation detection unit 40, the driving unit 41 drives the vibration elements 14 to generate the first vibration W1 for the panel 10 and then to generate the second vibration W2 greater than the first vibration W1 for the panel 10. Thereby, it is possible to enable the user U to feel the sense of depth and the sense of click, so that it is possible to provide the user U with the operational feeling similar to the operational feeling on the mechanical switch.

Also, the first vibration W1 is the sawtooth wave-shaped vibration or the triangular wave-shaped vibration. Thereby, it is possible to appropriately provide the user U with the sense of depth upon the pressing on the switch while suppressing the sound to be output from the panel 10 to a level at which the user U operating the panel 10 cannot hear or little hears the sound.

Also, the first vibration W1 is a vibration biased to one side or the other side in the thickness direction of the panel 10 with respect to the center O of the panel 10 in the thickness direction. Thereby, it is possible to more appropriately provide the user U with the sense of depth upon the pressing on the switch, as compared to the first vibration W1 that is not biased with respect to the center O.

Also, the user operation is the pressing operation on the operation surface 15 of the panel 10 or the slide operation in a direction parallel with the panel 10. Thereby, in response to the pressing operation or the slide operation on the operation surface 15 of the panel 10, it is possible to provide the user U with the operational feeling similar to the operational feeling on the mechanical switch.

Also, when the pressure (the contact pressure of the user U on the operation surface 15) or movement (a moving amount of the contact position of the user U on the operation surface 15) of the user operation becomes the first threshold Pth1 or greater or the first threshold Dth1 or greater, the driving unit 41 continues to generate the first vibration W1 for the panel 10. Thereafter, when the pressure of the user operation becomes equal to or greater than the second threshold Pth2 greater than the first threshold Pth1 or the movement of the user operation becomes equal to or greater than the second threshold Dth2 greater than the first threshold Dth1, the driving unit 41 generates the second vibration W2 for the panel 10. Thereby, it is possible to provide the user U with a more realistic operational feeling similar to the operational feeling on the mechanical switch.

Also, when the pressure of the user operation becomes the third threshold Pth3 or smaller after the second vibration W2 is generated for the panel 10, the driving unit 41 generates the third vibration W3 greater than the first vibration W1 for the panel 10. Thereby, it is possible to provide the user U with a sense, which the user U can feel when detaching the finger 50 from the switch.

Also, the driving unit 41 generates the first vibration W1 for the panel 10 only for the preset first time period T1 after the user operation is detected, and then generates the second vibration W2 for the panel 10 only for the preset second time period T2 shorter than the first time period T1. Thereby, irrespective of the pressure of the user operation, it is possible to generate the second vibration W2, and to reduce the processing load in the control device 20.

Also, when the third time period T3 elapses after the second vibration W2 is generated for the panel 10, the driving unit 41 generates the third vibration W3 greater than the first vibration W1 for the panel 10. Thereby, irrespective of the pressure of the user operation, it is possible to generate the third vibration W3, to reduce the processing load in the control device 20, and to provide the user U with a sense, which the user U can feel when detaching the finger 50 from the switch.

The additional effects and modified embodiments can be easily conceived by one skilled in the art. For this reason, the wider aspect of the disclosure is not limited to the specific and representative illustrative embodiment described in the above. Therefore, a variety of changes can be made without departing from the spirit or scope of the disclosure defined in the claims and equivalents thereto

What is claimed is:

1. A control device comprising:
   an operation detection unit configured to detect an operation of a user on an operation surface of a panel, and
   a driving unit configured to drive a vibration element attached to the panel to generate a vibration for the panel,
   wherein when the operation is detected by the operation detection unit, the driving unit drives the vibration element to generate a first vibration for the panel only for a first time period and then to generate a second vibration only for a second time period, the second vibration having an amplitude greater than an amplitude of the first vibration for the panel, the second time period being shorter than the first time period.

2. The control device according to claim 1, wherein the first vibration is a sawtooth wave-shaped vibration or a triangular wave-shaped vibration.

3. The control device according to claim 1, wherein the operation is a pressing operation on the operation surface or a slide operation in a direction parallel with the panel.

4. The control device according to claim 1, wherein when a pressure or a distance of the operation becomes a first threshold or greater, the driving unit continues to generate the first vibration for the panel, and when the pressure or distance becomes thereafter equal to or greater than a second threshold greater than the first threshold, the driving unit generates the second vibration for the panel.

5. The control device according to claim 4, wherein when the pressure becomes a third threshold or smaller after the second vibration is generated for the panel, the driving unit generates a third vibration which has an amplitude greater than the amplitude of the first vibration for the panel.

6. The control device according to claim 1, wherein when a third time period elapses after the second vibration is generated for the panel, the driving unit generates a third vibration which has an amplitude greater than the amplitude of the first vibration for the panel.

7. The control device according to claim 1, wherein the first vibration is a sawtooth wave-shaped vibration that rises from a starting position to a final position in a first period of time and returns from the final position to the starting position in a second period of time longer than the first period of time.

8. The control device according to claim 1, wherein the driving unit is configured to drive the vibration element based on a fixed mode or a variable mode in accordance with a selection by the user,
the fixed mode is a mode of vibrating the panel with a fixed vibration pattern in response to a pressing operation of the user, and
the variable mode is a mode of vibrating the panel with a vibration pattern corresponding to a state of the pressing operation of the user.

9. The control device according to claim 1, wherein the first vibration is a vibration that causes panel displacement biased to one side or the other side in a thickness direction of the panel with respect to a center of the panel in the thickness direction.

10. The control device according to claim 1, wherein the second vibration is a vibration that causes even panel displacement with respect to the center of the panel in the thickness direction.

11. The control device according to claim 1, wherein the driving unit is configured to drive the vibration element based on a fixed mode or a variable mode in accordance with a selection by the user,
the fixed mode is a mode of vibrating the panel with a fixed vibration pattern in response to a pressing operation of the user, and
the variable mode is a mode of vibrating the panel with a vibration pattern corresponding to a state of the pressing operation of the user.

12. An input system comprising:
a panel having an operation surface;
a vibration element configured to vibrate the panel;
an operation detection unit configured to detect an operation of a user on the operation surface, and
a driving unit that, when the operation is detected by the operation detection unit, outputs a driving voltage for generating a first vibration for the panel only for a first time period to the vibration element, and then outputs a driving voltage for generating a second vibration for the panel only for a second time period to the vibration element, the second vibration having an amplitude greater than an amplitude of the first vibration, the second time period being shorter than the first time period.

13. A control method comprising processes of:
detecting an operation of a user on an operation surface of a panel;
generating a first vibration for the panel only for a first time period when the operation is detected, and
generating a second vibration only for a second time period after the first vibration is generated for the panel, the second vibration having an amplitude greater than an amplitude of the first vibration for the panel, the second time period being shorter than the first time period.

14. A control device comprising:
an operation detection unit configured to detect an operation of a user on an operation surface of a panel, and
a driving unit configured to drive a vibration element attached to the panel to generate a vibration for the panel,
wherein when the operation is detected by the operation detection unit, the driving unit drives the vibration element to generate a first vibration for the panel and then to generate a second vibration which has an amplitude greater than an amplitude of the first vibration for the panel,
when a pressure of the operation becomes a first threshold or greater, the driving unit continues to generate the first vibration for the panel, and when the pressure becomes thereafter equal to or greater than a second threshold greater than the first threshold, the driving unit generates the second vibration for the panel,
when the pressure becomes a third threshold or smaller after the second vibration is generated for the panel, the driving unit generates a third vibration which has an amplitude greater than the amplitude of the first vibration for the panel,
the third threshold is greater than the first threshold and is smaller than the second threshold.

15. The control device according to claim 14, wherein the first vibration is a sawtooth wave-shaped vibration or a triangular wave-shaped vibration.

16. The control device according to claim 14, wherein the first vibration is a vibration that causes panel displacement biased to one side or the other side in a thickness direction of the panel with respect to a center of the panel in the thickness direction.

17. The control device according to claim 14, wherein the second vibration is a vibration that causes even panel displacement with respect to the center of the panel in the thickness direction.

18. The control device according to claim 14, wherein when a third time period elapses after the second vibration is generated for the panel, the driving unit generates a third vibration which has an amplitude greater than the amplitude of the first vibration for the panel.

19. The control device according to claim 14, wherein the first vibration is a sawtooth wave-shaped vibration that rises from a starting position to a final position in a first period of time and returns from the final position to the starting position in a second period of time longer than the first period of time.

* * * * *